United States Patent Office 3,745,174
Patented July 10, 1973

3,745,174
ISOINDOLE DERIVATIVES AND
PREPARATION THEREOF
Roger Frederick Challis Brown, and Reginald James Smith, Mount Waverley, Victoria, Australia, assignors to Monash University, Clayton, Victoria, Australia
No Drawing. Filed Sept. 16, 1970, Ser. No. 72,816
Claims priority, application Australia, Sept. 23, 1969, 61,255/69
Int. Cl. C07d 27/54
U.S. Cl. 260—326.1    7 Claims

ABSTRACT OF THE DISCLOSURE

A new compound, 1-cyanoisoindole, is prepared from 3-aminoisoquinoline via new intermediates, typically by treatment with ethyl chloroformate to produce 3-ethoxycarbonyl aminoisoquinoline, oxidation to the 2-oxide thereof, then ring-contraction by pyrolysis.

---

This invention relates to new chemical compounds including 1-cyanoisoindole of the following Formula I and derivatives thereof, and processes for their preparation, as well as certain novel intermediates.

(1) 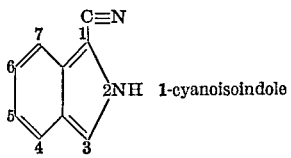 1-cyanoisoindole

The derivatives include those in which the —C≡N group is converted to other groups, for example —COOR, —COOH, or —COR in which R is an alkyl group; and those which are substituted in one or more of the 3, 4, 5, 6 and 7 positions, for example by groups stable to temperatures of 500° to 600° C., e.g. $CH_3$, CN, F, Cl.

Accordingly the invention provides a process for preparing an unsubstituted or carbon-substituted 1-cyanoisoindole comprising treating 3-aminoisoquinoline, which may be unsubstituted or carbon-substituted, with an alkyl chloroformate in a solvent to form the corresponding 3- alkoxycarbonylaminoisoquinoline, converting the 3-alkoxycarbonylaminoisoquinoline to the corresponding 3-alkoxycarbonylaminoisoquinoline-2-oxide by oxidation, and pyrolyzing the 3-alkoxycarbonylaminoisoquinoline-2-oxide to effect ring contraction to yield the corresponding 1-cyanoisoindole.

The 3-alkoxycarbonylamino isoquinolines and the 2-oxides thereof are also novel compounds. The alkyl chloroformate is suitably methyl- or ethyl-chloroformate and pyridine is a suitable solvent. The oxidation is preferably effected by aqueous hydrogen peroxide in glacial acetic acid. The pyrolysis is preferably effected at a temperature in the range 450 to 700° C.

In a preferred embodiment of the invention there is provided a process for the preparation of 1-cyanoisoindole in which (a) 3-aminoisoquinoline is treated with ethyl chloroformate in pyridine to form 3-ethoxycarbonylaminoisoquinoline;
(b) 3-ethoxycarbonylaminoisoquinoline produced as in (a) is converted to 3-ethoxycarbonylaminoisoquinoline-2-oxide by oxidation with aqueous hydrogen peroxide in glacial acetic acid;
(c) 3-ethoxycarbonylaminoisoquinoline - 2 - oxide produced as in (b) is pyrolyzed preferably at a temperature in the range 450 to 700° C. to yield 1-cyanoisoindole.

The reactions may be diagrammatically represented as follows:

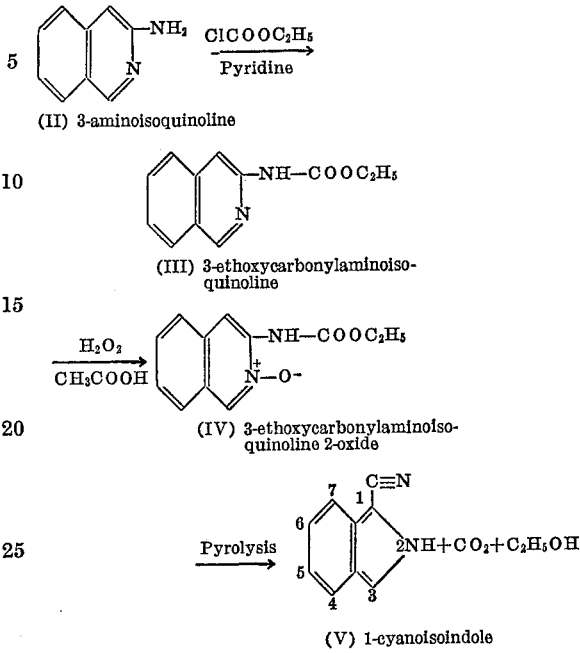

The compounds of the present invention find applications in the dyestuff, pharmaceutical, veterinary and agricultural chemical fields.

The following specific example is given to further illustrate the invention insofar as it relates to the preparation of 1-cyanoisoindole itself by the preferred route set out above.

Preparation of 3-ethoxycarbonylaminoisoquinoline 3-aminoisoquinoline (1.01 g., 7 mmoles) dissolved in pyridine (30 ml.) at 0° C. was treated with ethyl chloroformate (1.22 g., 11.3 mmole) which was added dropwise with stirring. The mixture was then allowed to stand at room temperature overnight. Some product precipitated during this time. This was collected by filtration, and the filtrate was concentrated under reduced pressure. Addition of water (30 ml.) precipitated further product. The combined crude product (1.41 g., 93% yield), was recrystallized from ethanol to give 3-ethoxycarbonylaminoisoquinoline as colourless crystals from ethanol, M.P. 187–188°. (Found: C, 66.38; H, 5.43; N, 12.98. $C_{12}H_{12}N_2O_2$ requires C, 66.65; H, 5.59; N, 12.96%.) Infrared spectrum: 3160 and 1710 cm.$^{-1}$. Mass spectrum: M/e 216 (M$^+$, base peak).

The starting material 3-aminoisoquinoline is obtained according to F. Johnson and W. A. Nasutavious, J. Org. Chem., 1962, 3953.

Preparation of 3-ethoxycarbonylaminoisoquinoline 2-oxide

3 - ethoxycarbonylaminoisoquinoline (1.1 g., 5.1 mmoles) was suspended in glacial acetic acid (40 ml.), 30% aqueous hydrogen peroxide (2 ml.) was added, and the mixture was heated at 70° C. for 20 hours. The solvent evaporated under reduced pressure, and the remaining viscous oil was stirred for 10 minutes with water (20 ml.) whereupon the oil crystallized. The aqueous mixture was made alkaline with solid potassium carbonate, and the crude product (1.0 g., 92%) collected by filtration. Recrystallization from ethyl acetate gave 3-ethoxycarbonylaminoisoquinoline 2-oxide as yellow needles, M.P. 161–163° C. (Found: C, 62.07; H, 5.22; N, 12.23.

$C_{12}H_{12}N_2O_3$ requires C, 62.06; H, 5.21; N, 12.06%.) Infrared spectrum: 3260 and 1735 cm.$^{-1}$. Mass spectrum: M/e 232 (M$^+$, base peak). On treatment with ethanolic ferric chloride solution this compound produced an intense red colour.

Pyrolytic preparation of 1-cyanoisoindole (I)

Apparatus: The pyrolysis apparatus consisted of a horizontal silica tube (40 cm. x 2 cm. I.D.) packed with short lengths of silica tubing (7 mm. O.D. and 5 mm. I.D.; approximately 5 mm. long) over the central 30 cm. This central section of the tube was heated by an external electris furnace. The temperature of the furnace was measured before the experiment using a silica-sheathed thermocouple placed in a position corresponding to that of the silica tube used during the experiment. The sample was sublimed into the tube from a 50 ml. flask heated externally with an air bath at 160° C. The emergent product was collected in a depression in the exit elbow leading from the pyrolysis tube, and more volatile vapours were trapped in a cold trap cooled with liquid nitrogen. The system was evacuated with a two-stage vacuum pump, and the pressure in the system was measured with a Vacustat gauge on the exit below.

Process details: 3-ethoxycarbonylaminoisoquinoline 2-oxide (IV) (102 mg., 0.43 mmole) was sublimed at 0.05 mm. pressure during one hour through the packed silica tube heated at 600°±10°. A faintly yellow solid product collected in the exit elbow, and was shown by thin layer chromatography on silica gel with chloroform to be a single compound. The crude product weighed 62.8 mg., corresponding to 100% yield of 1-cyanoisoindole. Purification by vacuum sublimation at 100° C./0.05 mm. gave 1-cyanoisoindole as colourless crystals, M.P. 132-134°. (Found: C, 75.59; H, 4.59; N, 19.0; $C_9H_6N_2$ requires C, 76.1; H, 4.2; N, 19.7%.) Ultraviolet spectrum: $\lambda_{max}$ (ethanol) 224, 248, 256 and 340 nm. Infrared spectrum (chloroform): 3250, 2209, and 2205 cm.$^{-1}$. Mass spectrum (major peaks): M/e 142 (M$^+$, 100%), 115 (45%), 88 (27%), and 63 (32%).

On treatment with Ehrlich's reagent (p-dimethylaminobenzaldehyde in 10 N-hydrochloric acid) a deep green colour was produced. On dilution with a large volume of ethanol this changed to deep blue and showed $\lambda_{max}$. (ethanol) 583 and 668 nm.

The 1-cyanoisoindole so produced was further identified as follows:

The isoindole (10 mg.) was heated under reflux with potassium permanganate (41 mg.) in water (1 ml.) containing sodium hydroxide (1 mg.) for 2.5 hours. The dark brown solution was cooled, carefully acidified with 2 N-sulphuric acid, and then heated again for 0.5 hr. Saturated sodium bisulphite solution was added to dissolve precipitated manganese dioxide, and the solution was then extracted with ether (5× 2 ml.). Evaporation of the ether gave a crystalline residue, which was sublimed at 140° (bath) and 0.01 mm. to give a faintly yellow sublimate. The sublimate was refluxed with aniline (1 ml.) for 1 hour, then diluted with ether (5 ml.), and extracted three times with 2 N-hydrochloric acid and then with water. Evaporation of the ether and recrystallization from ethanol gave N-phenylphthalimide as fine needles, M.P. 209-210°, not depressed by admixture with an authentic sample. The identity of the compound was further established by thin layer chromatography (silica gel/chloroform) against an authentic sample.

Substituted derivatives of 1-cyanoisoindole may be prepared by methods analogous to the foregoing, as will be readily appreciated by persons skilled in the art.

We claim:

1. Process for preparing 1-cyanoisoindole comprising pyrolyzing 3-alkoxycarbonylaminoisoquinoline-2-oxide to effect ring contraction.

2. Process according to claim 1 wherein the alkoxy is methoxy or ethoxy.

3. A process according to claim 2 wherein pyrolyzing is performed at a temperature in the range from 450 to 700° C.

4. A process according to claim 1 wherein pyrolyzing is performed at a temperature in the range from 450 to 700° C.

5. Process for the preparation of 1-cyanoisoindole in which 3 - ethoxycarbonylaminoisoquinoline - 2 - oxide is pyrolyzed to yield 1-cyanoisoindole.

6. Process according to claim 1, in which the pyrolysis is effected at a temperature in the range 450 to 700° C.

7. 1-cyanoisoindole.

References Cited

UNITED STATES PATENTS 3,385,865   5/1968   Metzler _____ 260—326.1

JOSEPH A. NARCAVAGE, Primary Examiner

U.S. Cl. X.R.

260—287